United States Patent [19]

Land

[11] 4,047,213
[45] Sept. 6, 1977

[54] METHOD AND APPARATUS FOR HEATING CASSETTE CONTAINED FILM STRIP DURING PROCESSING

[75] Inventor: Edwin H. Land, Cambridge, Mass.

[73] Assignee: Polaroid Corporation, Cambridge, Mass.

[21] Appl. No.: 647,740

[22] Filed: Jan. 9, 1976

[51] Int. Cl.² .......................................... G03D 13/00
[52] U.S. Cl. .................................. 354/299; 219/216; 352/78 R; 352/130; 354/317
[58] Field of Search ................. 354/299, 317, 78, 340, 354/88; 352/72, 78 R, 130; 219/216

[56] References Cited

U.S. PATENT DOCUMENTS

| | | | |
|---|---|---|---|
| 2,576,022 | 11/1951 | Land | 354/299 |
| 3,554,107 | 1/1971 | McCarthy et al. | 354/299 |
| 3,809,464 | 5/1974 | Bennett | 354/88 |
| 3,839,726 | 10/1974 | Reichardt | 354/299 |

Primary Examiner—L. T. Hix
Assistant Examiner—J. A. LaBarre
Attorney, Agent, or Firm—David R. Thornton

[57] ABSTRACT

A film strip heating method and apparatus for use in photographic systems of the type in which a film strip, contained in a multi-purpose cassette during exposure, processing and projection, is processed by insertion of the cassette in a viewer operative to release a cassette-contained supply of processing fluid, and in which localized heating of the film strip is effected during the processing operation to enhance the diffusion transfer developing process. Heating and temperature sensing components located in the cassette are connected with a control circuit in the viewer automatically upon insertion of the cassette in the viewer.

10 Claims, 8 Drawing Figures

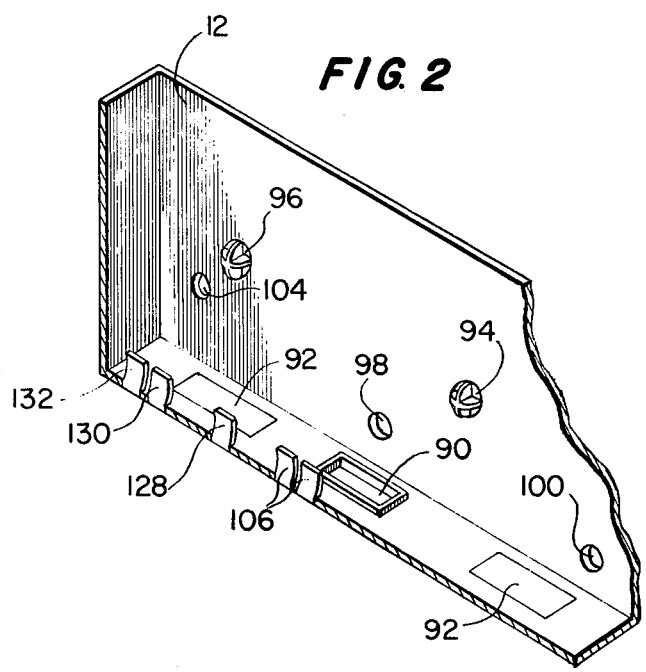

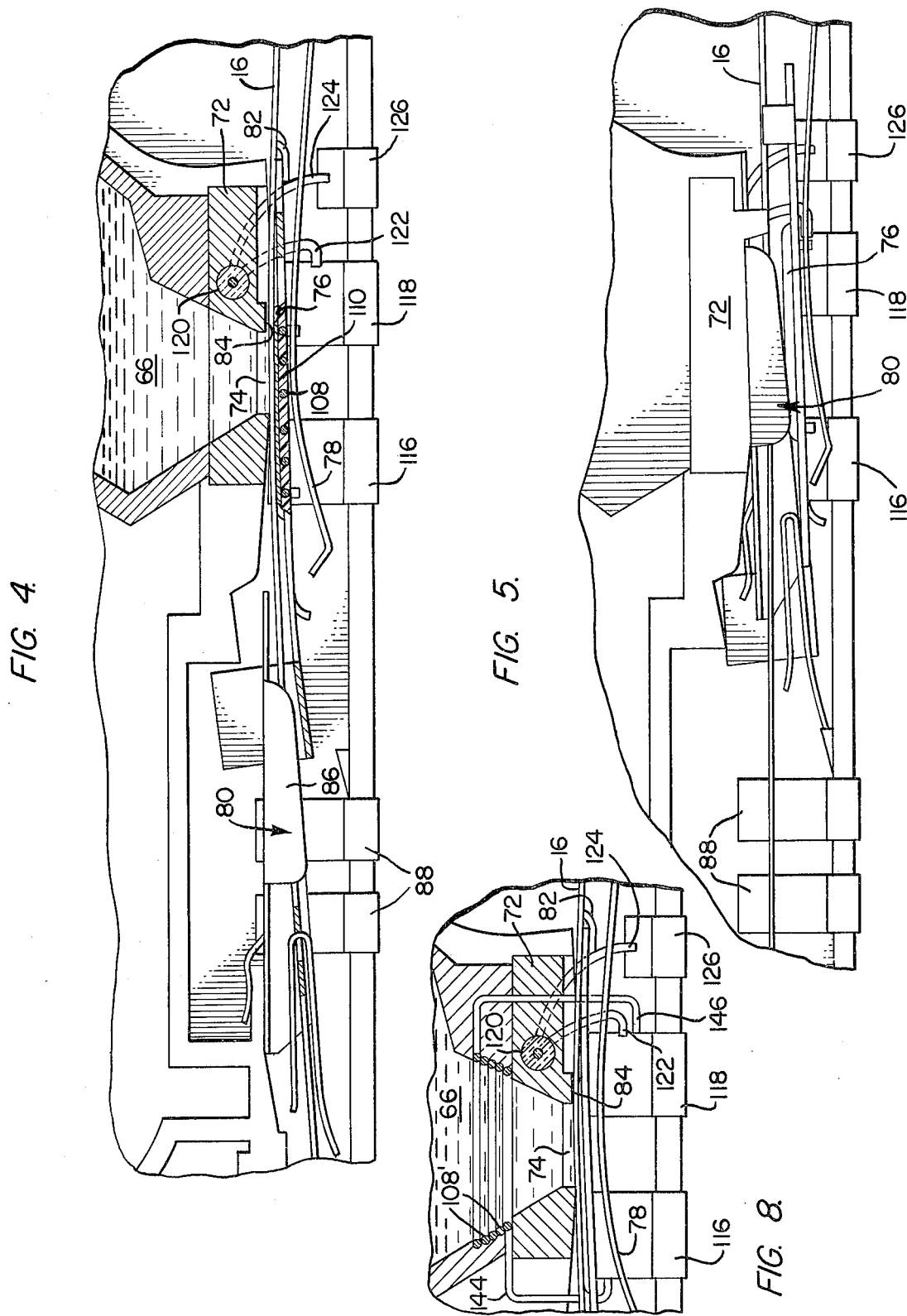

METHOD AND APPARATUS FOR HEATING CASSETTE CONTAINED FILM STRIP DURING PROCESSING

BACKGROUND OF THE INVENTION

This invention relates to photographic systems of the type employing multi-purpose film cassettes in which a strip of photographic film contained in such a cassette, is exposed, processed and projected by appropriate manipulation of the cassette without removal from the cassette. More particularly, it concerns a novel method and apparatus for processing the exposed film strip in the cassette under accurately controlled and uniform temperatures.

In U.S. Pat. No. 3,800,306 issued Mar. 26, 1974 to Edwin H. Land, there is disclosed a photographic system particularly suited to motion picture application in which a film cassette containing a strip of photographic film, a supply of processing fluid and a processor operative to apply the processing fluid to the film strip upon manipulation thereof in the cassette is first mounted in an appropriate camera for incremental exposure along the length of the film strip in accordance with conventional motion picture film strip exposure techniques. During the exposure cycle, the film strip is advanced from a supply spool on which it is initially wound in the cassette to a take-up spool about which all of the film is wound after exposure with the exception of a supply spool leader which extends back to and is permanently connected to the supply spool. Following exposure of the film strip, the cassette is removed from the camera and inserted in a film drive and projection system or viewer adapted to receive the cassette and which is responsive to the condition of the film in the cassette to effect either a processing cycle in which the strip is rewound during the application of the processing fluid to the emulsion side of the film strip or a projection cycle in the event the film contained in the cassette has been processed previously.

The processing cycle of operation in the system disclosed in the aforementioned patent is carried out by driving the supply spool in a direction of rewind rotation to effect first a removal of a tear tab closure from an initially sealed supply reservoir or pod of processing fluid. The viewing apparatus is programmed so that subsequent to the removal of the tear tab closure and release of processing fluid, rewind drive of the strip is interrupted for the duration of a short time delay to enable gravity flow of the processing fluid to an applicator nozzle overlying the emulsion side of the film strip and which forms part of the processor contained in the cassette. After the time delay, the supply spool rewind drive in the viewer is again actuated to advance the film strip at constant speed under the applicator nozzle so that a uniform layer of processing fluid is deposited on the film strip along the entire length thereof. The processing fluid reacts chemically with the exposed, light sensitive emulsion on the film strip to develop the latent negative image within the emulsion layer and transfer a positive image to a positive image receiving layer. The attainment of a defect-free series of positive images on the film strip in this manner is dependent on the uniformity of processing fluid deposition during the processing cycle. To this end, the processor disclosed in the aforementioned U.S. patent incorporates an inclined doctoring surface in the nozzle applicator against which the film strip is retained by a yieldable pressure pad bearing against the opposite side of the film strip. The hydrodynamic pressure gradient resulting from this organization assures a uniform doctoring or buttering of the processing fluid across the width of the film strip and along the entire length thereof. Upon completion of the processing cycle, a surface discontinuity in the take-up spool leader of the film strip or at the end of the film strip last to be processed engages a valve member provided in the cassette and moves it into closing relationship with the applicator nozzle opening. This assures containment of residual amounts of processing fluid which may be present in the processor and which could be deleterious to the processed film strip until such time as it evaporates. In addition to containing residual amounts of processing fluid, the valve member movement is from a condition in which a pair of electrical contacts are in circuit continuity to one of circuit discontinuity. Such contacts or terminals on the cassette are engaged by mating contacts in the viewing apparatus to enable the latter to sense the processed or unprocessed condition of the film strip in a given cassette.

Although the system disclosed in the aforementioned U.S. patent represents a highly sophisticated advance particularly in the motion picture art, proper processing of the exposed film is vital to basic system objectives inasmuch as any defect in the processing operation is likely to cause permanent blemishes in the positive image transparencies carried by the film strip and which are visible during subsequent and repeated projection cycles. It is important, therefore, that the conditions under which the processing operation is carried out be maintained as favorable as possible both from the standpoint of facilitating the action of the processing fluid on the exposed emulsion and from the standpoint of minimizing the duration of time the processing fluid is maintained in a liquid or semi-liquid state after deposition on the emulsion side of the film strip. In these latter respects, it is known in the prior art that diffusion transfer processing of photographic films is enhanced where such processing takes place at constant temperature and also that the rate of image development and transfer is increased at temperatures slightly above normal room temperatures. See, for example U.S. Pat. No. 2,576,022 issued Nov. 20, 1951 to E. H. Land; U.S. Pat. No. 2,794,377 issued June 4, 1957 to M. N. Fairbank; U.S. Pat. No. 3,143,950 issued Aug. 11, 1964 to E. W. Elliott et al.; and U.S. Pat. No. 3,608,456 issued Sept. 28, 1971 to A. H. Hauser.

With the exception of the patent to Elliott et al, each of these prior art references disclose self-developing still cameras in which discrete prints are formed using the diffusion transfer developing process and in which the processing fluid or liquid is spread between or supplied in a temporary covering sheet overlying the sheet on which the positive print is formed and ultimately viewed after removal of the covering sheet. In the Elliott et al patent, the continuous strip of photographic film is fed from a supply cassette through a camera to a separate takeup cassette in which the exposed film is wound concurrently on a spool with a web saturated with processing liquid. Visual observation of the prints developed on the film strip is possible only after the assembly is further manipulated by removal of the processing web from the developed film. While these references therefore recognize the desirable attributes of an elevated constant temperature environment for diffusion transfer processing of film, none of these references is concerned with film strip processing in which the processing fluid is deposited as a liquid directly onto the film strip to develop images capable of being immediately and directly viewed by projection.

SUMMARY OF THE PRESENT INVENTION

In accordance with the present invention, an improved method and apparatus is provided for processing an exposed film strip connected between supply and take-up spools permanently contained in a multi-purpose cassette by heating the film strip to a predetermined temperature or narrow range of temperatures elevated above ambient room temperature, the point of heat application being at or preceding the point of processing fluid deposition on a moving run of the strip so that processing variables and drying time are minimized. The film strip is heated preferably by an electrical heating element mounted on the back of a metallic pressure pad which engages the film strip and yieldably retains the opposite (emulsion) side thereof against a nozzle opening through which the processing fluid is applied to said opposite side of the strip as a thin liquid coating. Alternatively, the heating element may be located at the base of a fluid feed chamber so that the processing fluid will be heated to the desired temperature prior to passing the nozzle opening. Electric current is supplied to the heating element through terminals mounted on the exterior of the cassette and engagable upon insertion of the cassette into the viewing apparatus with appropriate viewer mounted terminals. The temperature of the film strip during operation of the heating element is monitored by a sensing probe located in the cassette and connected also by cassette mounted terminals engagable with viewer mounted contacts to establish a circuit between the viewer and the sensor independent of the circuit to the heating element. A temperature control circuit located physically in the viewer is connected to both the sensor and the heating element to enable accurate temperature regulation of the heating element and thus of the film strip and processing fluid deposited thereon during the processing operation.

Among the objects of the present invention are: the provision of an improved method and apparatus for processing an exposed photographic film strip permanently loaded in a film cassette and contained therein during exposure, processing and projection; the provision of such an improved method and apparatus by which an increment in a moving run of the film strip at or preceding the deposition of processing fluid thereon is maintained at a predetermined elevated temperature thereby enabling the attainment of increased film speed, faster processing and more uniform processing than was heretofore attainable in the processing of multi-purpose cassette contained film strips; the provision of such a method and apparatus enabling the use of processing fluid reagents which are relatively inactive at room temperature and thus more stable during storage prior to use but relatively highly reactive at elevated temperatures; the provision of an improved apparatus for controlling the temperature of a multi-purpose cassette contained film strip during processing by which the number of cassette contained components which are used only once during the life of a cassette are maintained at an absolute minimum; and the provision of an apparatus for regulating the temperature of a cassette contained film strip which is readily adaptable to existing photographic systems without extensive modification thereof.

Other objects and further scope of applicability of the present invention will become apparent from the detailed description to follow taken in conjunction with the accompanying drawing in which like reference numerals designate like parts.

BRIEF DESCRIPTION OF THE DRAWINGS

FIG. 2 is an enlarged fragmentary cross-section taken on line 2—2 of FIG. 1;

FIGS. 4 and 5 are enlarged fragmentary longitudinal cross-sections illustrating the cassette mounted temperature control components of the present invention during and subsequent to film strip processing;

FIG. 8 is an enlarged fragmentary cross-section similar to FIG. 4 but illustrating a modified embodiment of the present invention.

DETAILED DESCRIPTION OF THE PREFERRED EMBODIMENTS

Figure 1:
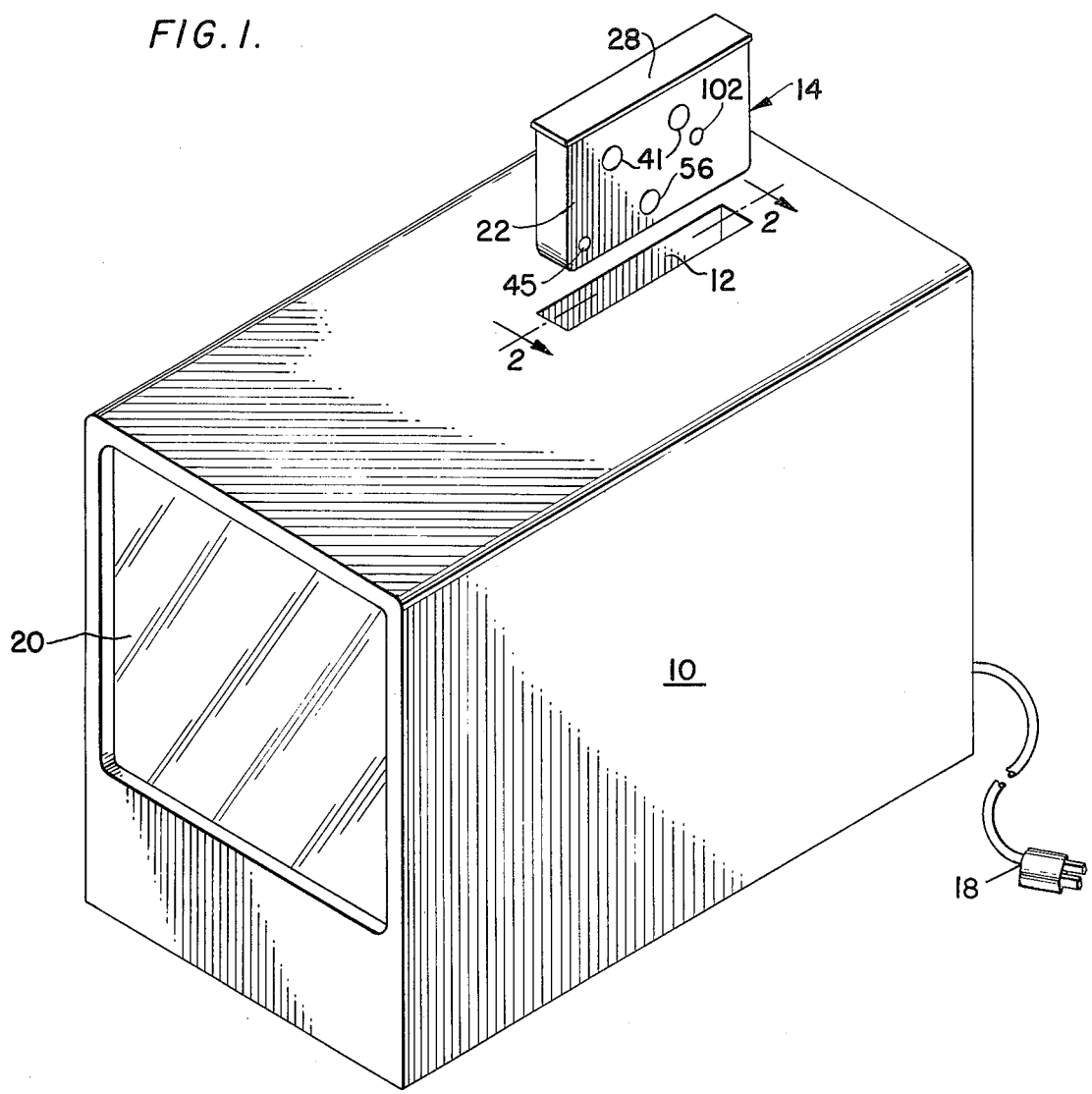
FIG. 1 is a perspective view of a cassette and processing viewer apparatus in the photographic system with which the present invention is used.

To facilitate a complete understanding of the method and apparatus of the present invention, basic mechanical and electrical components of the photographic system in which the present invention has particular application are illustrated in the drawings. Although such system components are described below in sufficient detail to enable one to practice the present invention, a more complete description of the system and its components may be found in the aforementioned U.S. Pat. No. 3,800,306 and in a copending application Ser. No. 428,377, now U.S. Pat. No. 3,895,862 filed Dec. 26, 1973 by Joseph A. Stella et al commonly owned with the present invention. The disclosures of the prior U.S. patent and copending patent application are therefore expressly incorporated by reference herein.

Figure 3:
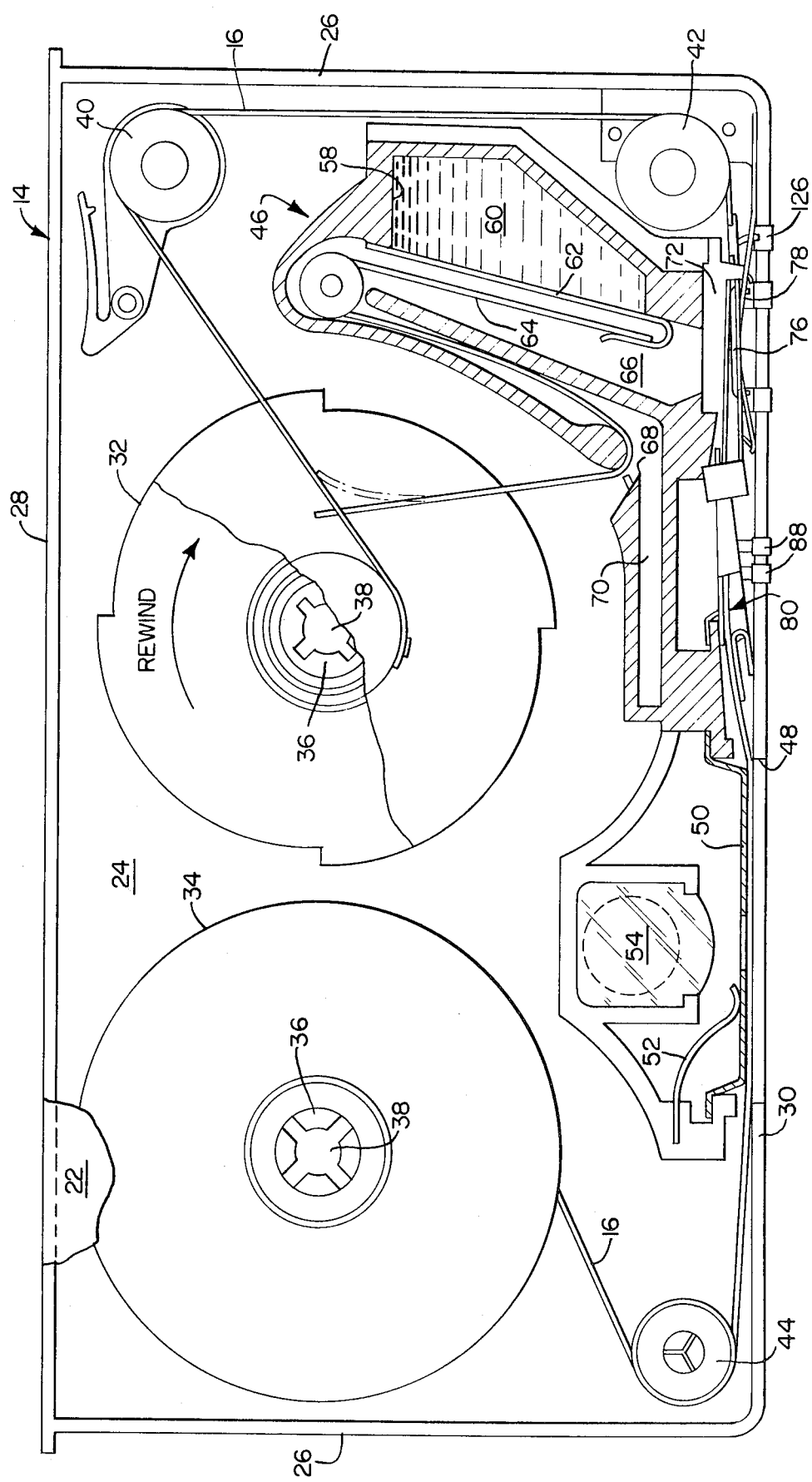
FIG. 3 is an enlarged longitudinal cross-section through the multi-purpose film cassette incorporating the present invention.

The photographic system in which the present invention has particular utility is illustrated in FIGS. 1-3 of the drawings to include a viewer 10 having a well 12 to receive a multi-purpose film cassette 14 in which a photographic film strip 16 is packaged and contained during exposure with the cassette mounted in a camera (not shown) processing and projection, the latter two operations being performed while the cassette 14 is received in the well 12 of the viewer. The viewer 10 is provided with a power cord and plug 18 for connection with a conventional utility outlet and houses a system of mechanical, electrical and optical components capable of effecting the film strip processing operation as well as subsequent projection of image transparencies developed thereon to a rear projection screen 20.

As shown in FIGS. 1 and 3, the cassette 14 is in the shape of a rectangular parallelepiped having front and back walls 22 and 24 respectively, end walls 26, a top wall 28 and a bottom wall 30. Mounted for rotation between the front and back walls are supply and take-up spools 32 and 34 to which supply and take-up leader ends of the film strip 16 are respectively affixed by appropriate means. The center hubs 36 of the supply and take-up spools 34 are formed to provide drive sockets 38 accessible through openings 41 in the front wall 22. In passing from the supply spool 32 to the take-up spool 34, the film strip 16 passes over a bobulator 40, an idler roll 42 and a snubber roll 44. The snubber roll 44 is provided with a slotted hub presented through an aperture 45 in the front wall 22 of the cassette so that it may be retained against rotation by appropriate means provided in both the viewer 10 and in the camera (not shown) during film exposure and projection operations. On rewind, the snubber roll 44 rotates freely. In the film strip run extending between the rolls 42 and 44, the films passes under a processor generally designated by the reference numeral 46 contained in the cassette and over an exposure-projection opening 48 located in the bottom wall 30 of the cassette. In passing over the opening 48, the film strip 16 is retained in a planar orientation by a pressure plate 50 yieldably urged against the film strip by a leaf spring 52. A light reflecting prism lens 54 is secured above the pressure plate 50 and film strip in registry with the opening 48 such that illumination from a viewer contained lamp may pass through a lens opening 56 in the front wall 22 of the cassette and then directed downwardly through the film and viewer optical system in the viewer 10 to be projected against the rear of the screen 20 all as described in the aforementioned U.S. Pat. No. 3,800,306.

The processor 46 illustrated in the embodiment is of the type disclosed in the aforementioned copending application Ser. No. 428,377 and includes a reservoir 58 containing an initially sealed supply of processing fluid 60 retained by a tear-tab closure 62 having its lower return end detachably secured to a pull strip 64 designed to latch with the supply spool leader end of the film strip 16 upon initial rewind movement of the strip. In particular, initial rewind movement of the film strip 16 and corresponding engagement of the pull strip 64 with the take-up spool leader thereof will wind the pull strip onto the take-up spool, pulling the tear-tab 62 from the position illustrated and releasing the processing fluid 60 to a feed chamber 66. The pull strip 64 and the tear-tab 62 are disconnected by a knife-like edge 68 delineating in part a permanent storage chamber 70 for the tear-tab closure 62 after it is removed from the reservoir 60.

The cassette carried components employed to achieve a uniform deposition of the processing liquid 60 onto the film strip during rewind travel thereof subsequent to exposure are illustrated in FIGS. 3-5 to include a plate-like nozzle 72 secured at the bottom of the processor 46 and having an opening 74 in direct fluid communication with the feed chamber 66, a pressure pad 76 to retain the film strip 16 yieldably against the nozzle opening 74 under the bias of a leaf spring 78 and a valve member generally designated by the reference numeral 80. The relative positions of the pressure pad 76 and valve member 80 are illustrated in FIGS. 3, 4 and 5 during exposure, processing and projection, respectively. Thus, as initially oriented in the cassette and retained in such orientation throughout initial passage of the film strip 16 from the supply spool 32 to the take-up spool 34 during exposure, the pressure pad 76 is retained in a rearward slightly spaced relationship with the bottom of the nozzle plate 72 to allow free passage of the film strip during exposure. At the end of the exposure cycle, a stuck out tab 82 in the take-up spool leader end of the film strip 16 advances the pressure pad slightly forward to the position shown in FIG. 5 in which it imposes a yieldable bias of the film strip upwardly against the underside of the nozzle plate 72. During rewind movement of the film strip at constant linear velocity, the processing liquid is passed directly onto the emulsion surface of the film strip 16 and spread uniformly by an inclined doctoring surface 84 positioned immediately behind the opening 74. At the end of the processing cycle, and aperture in the supply leader end of the film strip 16 engages the valve 80, sliding it from the position shown in FIG. 4 to the position shown in FIG. 5 wherein wedge-like ears 86 operate to cam the pressure pad 76 away from the nozzle plate 72 so that the film strip is again freed of any frictional drag during subsequent projection cycles. Also at this time, the upper surface of the valve 80 underlies the opening 74 to retain any residual processing fluid that may be present in the reservoir 66 after completion of the processing cycle. Further detailed explanation of these components and their operation is provided in the aforementioned U.S. Pat. No. 3,800,306.

Also as disclosed in the aforesaid U.S. patent, the valve member 80 cooperates with a pair of cassette carried electrical contacts or terminals 88 which extend through the bottom wall 30 and are presented at the corner between the bottom wall and the exterior of the rear wall 24 of the cassette 14. As shown in FIGS. 3 and 4, the valve member 80 bridges the contacts 88 in a manner to provide a circuit continuity between the terminals initially and throughout the processing cycle. At the end of the processing cycle, however, when the valve member 80 is moved to the position shown in FIG. 5, the terminals 88 are unconnected electrically. The electrical connection or disconnection of the terminals 88, as described in the aforementioned U.S. patent and also briefly hereinafter, provides an indication by which the control circuitry in the viewer 10 may distinguish an unprocessed cassette from one which has been processed and thus enable selection automatically of either a process mode of operation or a project mode of operation.

Viewer components cooperable directly with the cassette 14 after the cassette is received in the well 12 of the viewer are illustrated in FIG. 2 of the drawings. As shown, the bottom or floor of the well supports an aperture plate 90 of a configuration and size to complement and thus be received in the exposure projection aperture 48 in the bottom wall 30 of the cassette. A pair of lifting shoes 92 are also situated in the floor of the well 12 and are operable to eject the cassette partially from the well at the completion of a processing or projection cycle. In the side wall of the cassette well 12 confronting the front wall 22 of the cassette are mounted a pair of drive shafts 94 and 96 which are advanced upon insertion of the cassette into the well to engage with the drive sockets in the supply and take-up spools 32 and 34 respectively. A light aperture 98 becomes aligned with the prism lens 54 in the cassette for projection purposes and also a snubber roll engaging element is arranged to project through an opening 100 as shown in FIG. 2. The front wall 22 of the cassette carries a recess 102 which functions to locate and retain the cassette firmly within the well once it is inserted. Correspondingly, a locator pin (not shown) is arranged to project through an aperture 104 in the cassette well to engage and retain the cassette against movement in the well. Also a pair of terminals 106 are located in the floor of the well 12 opposite the wall in which the aforedescribed components are located and in a position to engage the terminals 88. The terminals 106 thus establish with the terminals 88 a portion of a cassette condition sensing circuit to distinguish a cassette which has been processed from one which has not been processed.

The components described above are more completely illustrated and described in the aforementioned U.S. Pat. No. 3,800,306. Although these components, therefore, are not novel with the present invention, they establish the environment of the present invention and are important to a complete understanding of and full appreciation for novel features of the present invention.

In accordance with the present invention, the diffusion transfer processing of the film strip 16 subsequent to exposure thereof is significantly enhanced by controlled feeding of the film strip in the run thereof passing under the nozzle opening 74 so that the temperature of processing may be maintained at a temperature or within a narrow range of temperatures above the temperature ambient to the cassette and viewer. The film strip is locally heated, e.g., to a temperature in the range of 90° to 120° F, and more preferably to a temperature in the range of 95° to 110° F, at or upstream from the point of processing fluid deposition in relation to the direction of film strip travel during processing. The beneficial results of so heating the film strip and thus the processing fluid applied to the emulsion surface of the strip are manifold. For example, the effective exposure index ("film speed") of the photographic film strip may be increased; development and transfer rates may be increased; and more uniform processing and sensitometric results may be obtained as a result of knowing that the film will be processed at a predetermined temperature, or within a predetermined narrow temperature range, and designing the film and processing liquid to provide optimized sensitometry at such temperature. In addition, processing at elevated temperatures is particularly advantageous in the cassette environment of the film strip to be processed inasmuch as the increased speed of processing is accompanied by increased rates of drying the processing fluid deposited onto the emulsion surface of the film strip in liquid form and immediately wound in convolutions on the take-up spool in the manner described above. Also in this respect, the processing of the film strip at elevated temperatures permits the use of processing reagents, whether initially in the film strip or in the processing fluid, which are relatively low in activity at temperatures below the processing temperature but significantly more active at the elevated temperature at which processing occurs. This enables the use of processing reagents which are more stable during storage in the cassette prior to use.

Figure 6:
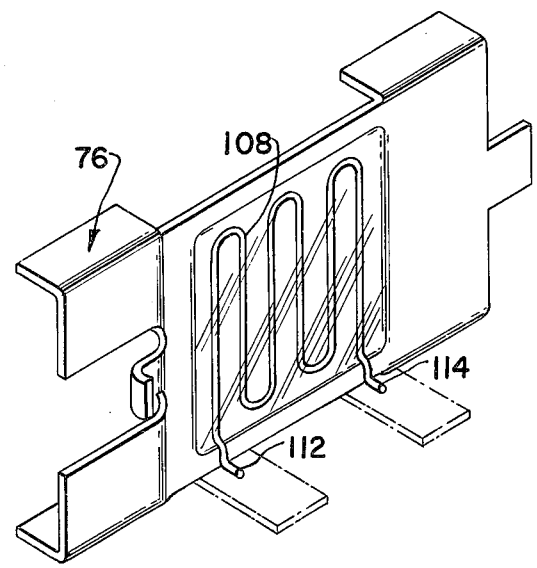
FIG. 6 is an enlarged perspective view illustrating the heating component of the present invention.

The structural components added to the cassette 14 to achieve the controlled heating of the film strip 16 therein during processing are illustrated most clearly in FIGS. 4 and 6 of the drawings. In particular, an electrical resistance heating element 108 potted or otherwise embedded in a dielectric plastic material 110 is secured directly to the back of the metallic pressure pad 76. Terminals 112 and 114 of the heating element 108 are electrically connected to contact elements 116 and 118 respectively extending from within the cassette to the exterior thereof in the same manner as the previously described indicating terminals contact elements 88. Electrical connection of the heating terminals 112 and 114 to the contact elements 116 and 118, in the embodiment illustrated, is established by frictional contact of the heating element terminals with the contact elements. In this manner, the circuit continuity will be maintained between the respective heater element terminals and the contact elements during all positions through which the pressure pad 76 is moved within the cassette. As a result of heat transfer through the metal of the pressure pad 76, heat will be applied directly to the side of the film strip opposite from the side of the photosensitive emulsion. It is noted that the film strip 16 employs a conventional transparent carrier of polyethylene terephthalate or the like so that the photosensitive emulsion layer may be exposed by light passing through the carrier strip. Thus if the side of the film strip presented to light during exposure is termed the "front" side, the emulsion is located on the "back" side of the strip 16.

To monitor the temperature of the film strip at the point of processing fluid deposition thereon, a temperature sensing element 120 is carried in the body of the nozzle plate 72 behind or downstream from the nozzle opening 74 in relation to the direction of film strip travel during processing. The sensing element 120 may be any of several known electrical temperature sensing elements such as a temperature responsive resistor having a pair of leads 122 and 124 across which the voltage drop of electricity will depend on the temperature of the sensing element 120. In the embodiment shown, the lead 122 is connected to the contact element 118 which, in relation to both the heating element 108 and to the sensing element 120, may be considered as a common ground. The lead 124 from the sensing element 120 is connected to a terminal contact element 126 extending also from the interior of the cassette to the exterior thereof in the manner of the contact element 88, 116 and 118.

Figure 7:
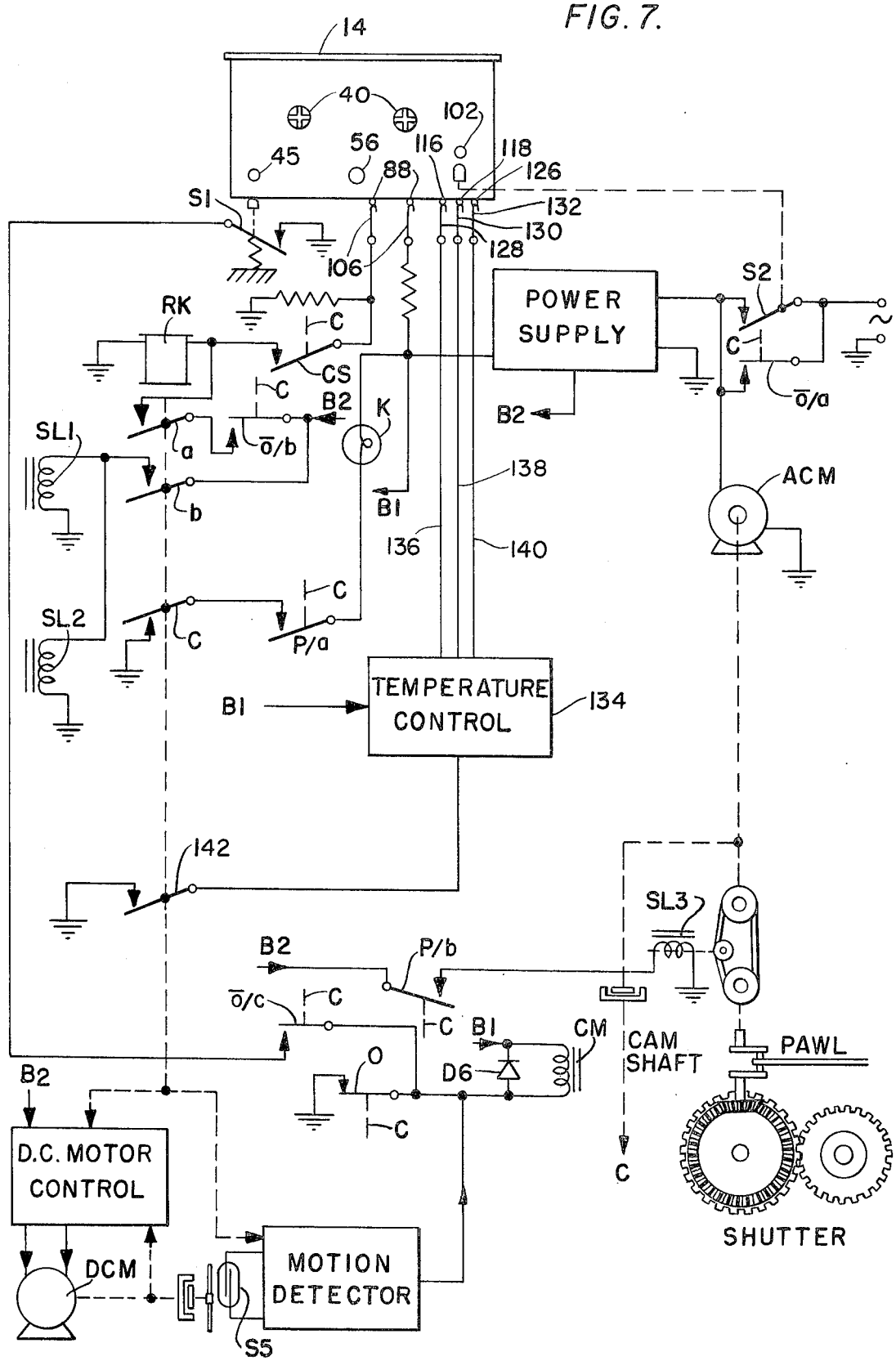
FIG. 7 is a circuit diagram of electrical components contained in the viewer illustrated in FIG. 1.

The manner is which electric current is applied both to the heating element 108 and to the sensing element 120 by the viewer 10 after the cassette 14 has been received in the well 12 of the viewer may be understood by reference to FIGS. 2 and 7 of the drawings. As shown in FIG. 2, terminal contacts 128, 130 and 132 are located in the floor of the well 12 in a position to be engaged by and make electrical contact with the contacts 116, 118 and 126, respectively. In this manner, the heating operation may be effected by the electric power available to the viewer 10 without requiring cassette mounted components in addition to those described. The importance of this aspect of the present invention can be appreciated by cognizance of the fact that the processing operation is carried out only once in each cassette 14 which functions as a permanent storage receptacle for the film strip 16 prior and subsequent to processing. Thus components carried within the cassette and used exclusively for processing are used only once during the life of the cassette.

In FIG. 7 of the drawings, the overall control circuitry of the viewer 10 is illustrated to enable a complete understanding of the manner in which the present invention is practiced in the system including the viewer 10 as well as the cassette 14. In accordance with the present invention, the existing viewer circuitry is modified only to incorporate a temperature control unit 134 connected by lines 136, 138 and 140 to respective contact terminals 128, 130 and 132 presented in the base of the viewer well 12. The temperature control unit 134 may be one of mny well-known temperature control units supplied with an input voltage B1 upon closure of a control switch 142 to supply current to the heating element 108 in response to voltage drop variations in the sensing element 120 correlated to the temperature of the sensing element 120.

All other circuit components illustrated in FIG. 7 of the drawings are illustrated and described in the aforementioned U.S. Pat. No. 3,800,306 (FIG. 45). Reference letter designations of components in FIG. 7 correspond directly to the reference letter designations employed in FIG. 47 of the aforementioned patent. Accordingly, further description of these components herein is deemed unnecessary except as these components have a direct bearing on the operation of the temperature control unit 134 during processing of the film strip 16.

Thus, as described in the aforementioned U.S. patent, insertion of the cassette 14 into the well 12 will cause a locator pin to be mechanically inserted into the locating aperture 102 in the front wall 22 of the cassette. When this occurs, the switch S2 will be closed to energize the power supply to provide direct current output voltages B1 and B2. Also closure of the switch S2 will energize an alternating current motor to initiate rotation of a cam shaft, the programmed mechanical output of which is designated in FIG. 7 by the reference numeral C. Hence, each of the several switches operated under the control of the cam shaft are likewise indicated as having a mechanical control represented symbolically in FIG. 7 and designated in each instance by the reference numeral C. Among these several cam controlled switches is a switch designated both in FIG. 7 and in FIG. 45 of the aforementioned patent by the reference letters CS. Closure of the switch CS will effect a circuit through the contacts 88 only if the valve member 80 described above provides circuit continuity between these terminals prior to processing and as illustrated in FIG. 4 of the drawings. Such a circuit continuity will operate to energize the relay RK which operates both to close the temperature control energizing switch 142 as well as the DC motor control. As described in the aforementioned patent, the DC motor control will operate to drive the take-up spool 32 in the cassette 14 through a predetermined increment of rewind travel sufficient to engage the pull-strip 64 and remove the processing fluid reservoir tear-tab 62 in the manner described above. After this increment of travel, the DC motor control operates to effect a time delay described in the aforementioned patent as enabling the processing fluid to settle into the feed chamber 66 over the nozzle opening 74. This time delay is important to the present invention inasmuch as it enables the temperature control unit 34 to be energized for a sufficient time in advance of processing initiation to bring the temperature of the heating element 108 to the desired temperature range. Thereafter, the film strip 16 will be rewound on the take-up spool 32 in the manner described to deposit the processing the fluid onto the emulsion surface of the film strip which is driven by the DC motor DCM (FIG. 7) and simultaneously heated to a temperature in the range of 90° to 100°.

The end of the processing cycle will be sensed by the motion detector of FIG. 7 and cause the cam shaft C to advance the film strip 16 through a mandatory projection cycle as described in the aforesaid U.S. patent. Subsequent insertion of the cassette 14 subsequent to processing will not energize the temperature control elements 134 inasmuch as no circuit will be completed to the relay RK through the cassette mounted terminals 88.

In an alternative embodiment of the invention illustrated in FIG. 8 of the drawings, the heating element 108' is located about the base of the feed chamber 66. Because the material from which the processor 46 is made is a dielectric plastic material the element 108' may be embedded directly under the surface of the material establishing the feed chamber base. Also electrical connection of the heating element 108' with the terminals 116 and 118 may be effected by leads 144 and 146. However, because there is no relative movement between the chamber 66 and the terminals 116 and 118 the connection need not be slidable as the previously described embodiment.

Operation of the embodiment of FIG. 8 will be essentially unchanged from that of the embodiment previously described. In this instance, however, the processing fluid will be preheated to the desired temperature upon passage through the nozzle opening 74 onto the film strip 16. Monitoring of the fluid temperature may also be utilized in the latter embodiment by including a temperature sensing element in portions of the processor which are contacted by the heated fluid, for example, in the nozzle and doctor areas.

Other arrangements for heating the processing fluid during or just prior to deposition may also be applicable. The fluid reservoir may retain an internal heating element with connections brought out from the latter to the cassette surface. Further, the retained fluid may be easily heated by thermal conduction from a heating element located outwardly of one wall of the reservoir; the wall being constructed of thermally conductive material such as metal. With appropriate insulation of the heating element, the latter may also be mounted on or in the wall itself.

Thus it will be appreciated that by this invention there are provided methods and apparatus for controlling the temperature of a photographic film strip contained at all times in an enclosed cassette and by which the above mentioned objectives may be achieved. Also it will be apparent to those skilled in the art that various changes and/or modifications may be made in the embodiments of the invention described herein without departure from the true spirit and scope of the present invention. It is expressly intended, therefore, that the foregoing description is illustrative of preferred embodiments only, not limiting, and that the true spirit and scope of the present invention be determined by reference to the appended claims.

What is claimed is:

1. A photographic cassette comprising:
    a housing having an opening therein;
    an initially unexposed elongated film strip;
    film advance means when driven for progressively advancing said film strip within said housing to traverse said opening, said film advance means being initially operative to facilitate the recording of a series of latent images along said film strip;
    means for applying a processing fluid to progressive incremental sections of said film strip to develop said film strip after exposure thereof and as said film strip is progressively advanced along a predetermined path past said applying means whereby substantially the entire length of said film strip is coated with the processing fluid;
    an electrical heating element positioned within said housing so as to increase the temperature of the processing fluid;
    electrical contacts mounted on said housing to be accessible to an external source of electrical energy; and
    means for electrically coupling said electrical contacts with said heating element, whereby said heating element is selectively energizable by such an externally mounted source of electrical energy.

2. The cassette of claim 1 wherein said electrical heating element is located within said housing to apply heat to incremental sections of said film strip at approximately the point at which, said processing fluid applying means applies processing fluid to said film strip.

3. The cassette of claim 1 wherein said processing fluid applying means is disposed on one side of said film strip within said housing and additionally including a pressure pad operative when processing fluid is being applied to said film strip to engage said film strip on the opposite side thereof from said processing fluid applying means and to urge said film strip toward said processing fluid applying means, and further wherein said electrical heating element is carried by said pressure pad.

4. The cassette of claim 1 additionally including:
a heat sensing probe positioned within said housing adjacent said predetermined path;
at least one other electrical contact mounted on said housing to be accessible to an externally mounted temperature control means; and
means for electrically coupling said heat sensing probe to said other electrical contact means to facilitate the maintenance, by such an externally mounted temperature control means, of a predetermined temperature condition at the location within said cassette at which the fluid is applied to said film strip.

5. The cassette of claim 1 wherein said applying means includes a chamber configured for feeding the fluid to said film strip, and said electrical heating element is located within said chamber so as to apply heat to the fluid as it is fed to said film strip.

6. A photographic system comprising:
a film cassette including:
a cassette housing;
an elongated strip of exposed unprocessed film retained within said cassette housing;
a processing fluid applicator within said housing, said applicator including means actuatable for applying processing fluid to progressive incremental sections of said film strip to develop said film strip as said film strip is advanced along a predetermined path traversing said applicator;
externally accesible film advance means when driven for advancing said film strip along said predetermined path within said cassette housing to traverse said fluid applicator;
an electrical heating element mounted within said cassette housing in close proximity to said predetermined film path and to said processing fluid applicator, said heating element being energizeable to increase the temperature of said processing fluid; and
an apparatus including:
means for receiving said film cassette;
means for actuating said fluid applicator and for driving said film advance means when said cassette is positioned in said receiving means; and
switch means for electrically coupling said cassette electrical contacts to a source of electrical energy when said cassette is positioned in said receiving means.

7. The system of claim 18 wherein said heating element is located within said cassette housing adjacent said predetermined path to apply heat to incremental sections of said film strip during film strip travel thereby increasing the temperature of the fluid applied thereto.

8. The system of claim 6 wherein said fluid applicator is actuatable in response to driving of said film advance means, and said means for driving said film advance means includes means for initially driving said film advance means so as to actuate said fluid applicator, halting said driving means for a predetermined time interval and then again driving said film advance means, and said switch means is rendered operative at least during said initial driving of said film advance means so that said heating element may reach a desired value during said predetermined interval and prior to further advance of said film strip.

9. Photographic apparatus comprising:
means for receiving a film cassette containing an elongated strip of exposed, undeveloped film, film advance means when driven for advancing said film strip along a predetermined path within said cassette, a processing fluid applicator actuatable responsive to advancement of said film strip for applying a coating of processing fluid to said film strip to develop said film strip, a heating element energizeable to increase the temperature of said processing fluid, and externally accessible contacts electrically coupled to said heating element;
selectively operative means for driving said film advance means;
switch means actuatable for coupling said contacts to an electrical source to heat said element; and
means for controlling said switch means and said driving means to energize said heating element and initially drive said film advance means to actuate said fluid applicator, then halt said driving of said film advance means for an interval during which said element is raised to its operating temperature, and subsequently again drive said film advance means to apply a coating of said fluid to substantially the full extent of said film strip.

10. The apparatus of claim 9 wherein said cassette includes means for indicating that said cassette is unprocessed, and said controlling means includes means responsive to said indicating means for actuating said switch means and said drive means.

* * * * *